United States Patent [19]

Takenaka et al.

[11] Patent Number: 4,743,967
[45] Date of Patent: May 10, 1988

[54] DIFFERENTIAL CODING APPARATUS HAVING AN OPTIMUM PREDICTED VALUE DETERMINING CIRCUIT

[75] Inventors: Yuuji Takenaka, Kawasaki; Toshihiro Homma, Yokohama; Kiichi Matsuda, Kawasaki, all of Japan

[73] Assignee: Fujitsu Limited, Kawasaki, Japan

[21] Appl. No.: 25,671

[22] Filed: Mar. 13, 1987

[30] Foreign Application Priority Data

Mar. 14, 1986 [JP] Japan ............................ 61-57301

[51] Int. Cl.$^4$ ............................................. H04N 7/137
[52] U.S. Cl. .................................... 358/136; 358/133; 375/27
[58] Field of Search ...................... 358/133, 135, 136; 375/27

[56] References Cited

U.S. PATENT DOCUMENTS

| | | | |
|---|---|---|---|
| 4,144,543 | 3/1979 | Koga | 358/136 |
| 4,437,119 | 3/1984 | Matsumoto et al. | 358/136 |
| 4,460,923 | 7/1984 | Hirano et al. | 358/136 |
| 4,542,411 | 9/1985 | Imanaka | 358/133 |
| 4,546,386 | 10/1985 | Matsumoto et al. | 358/136 |
| 4,571,618 | 2/1986 | Hatori | 358/136 |
| 4,633,325 | 12/1986 | Usubuchi | 358/133 |

FOREIGN PATENT DOCUMENTS 0181237  5/1986  European Pat. Off. .

OTHER PUBLICATIONS

Benischka, European Search Report, Vienna

*Primary Examiner*—Howard W. Britton
*Attorney, Agent, or Firm*—Staas & Halsey

[57] ABSTRACT

A differential coding apparatus having a plurality of predictive function computing circuits and an optimum predicted value determining circuit. The optimum predicted value determining circuit determines the optimum predicted value from the plurality of predicted values by using a quantized prediction error used as an output signal of the apparatus, instead of a local decoded signal, and carries out the determining operation of the optimum predicted value in parallel with the quantized prediction error producing operation.

13 Claims, 5 Drawing Sheets

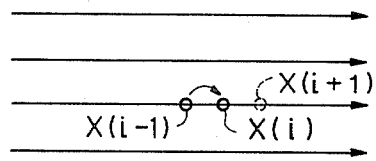
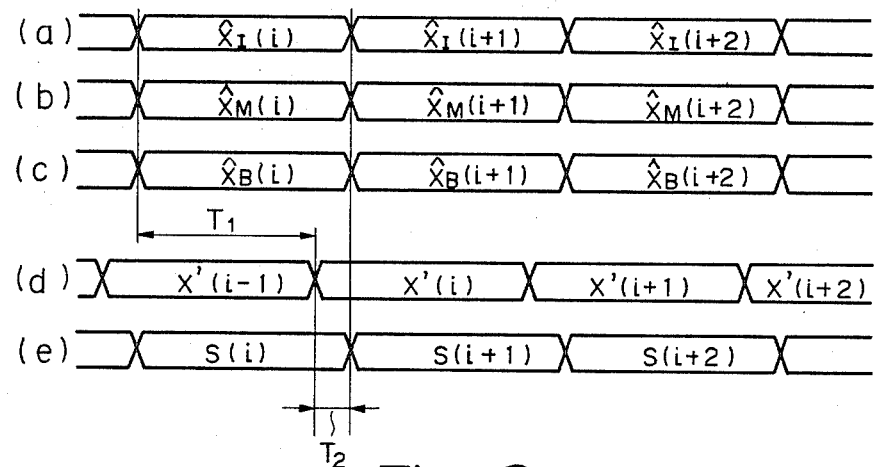
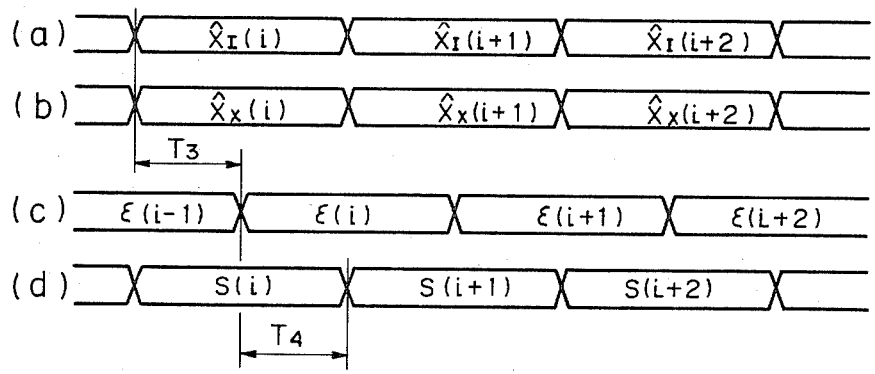

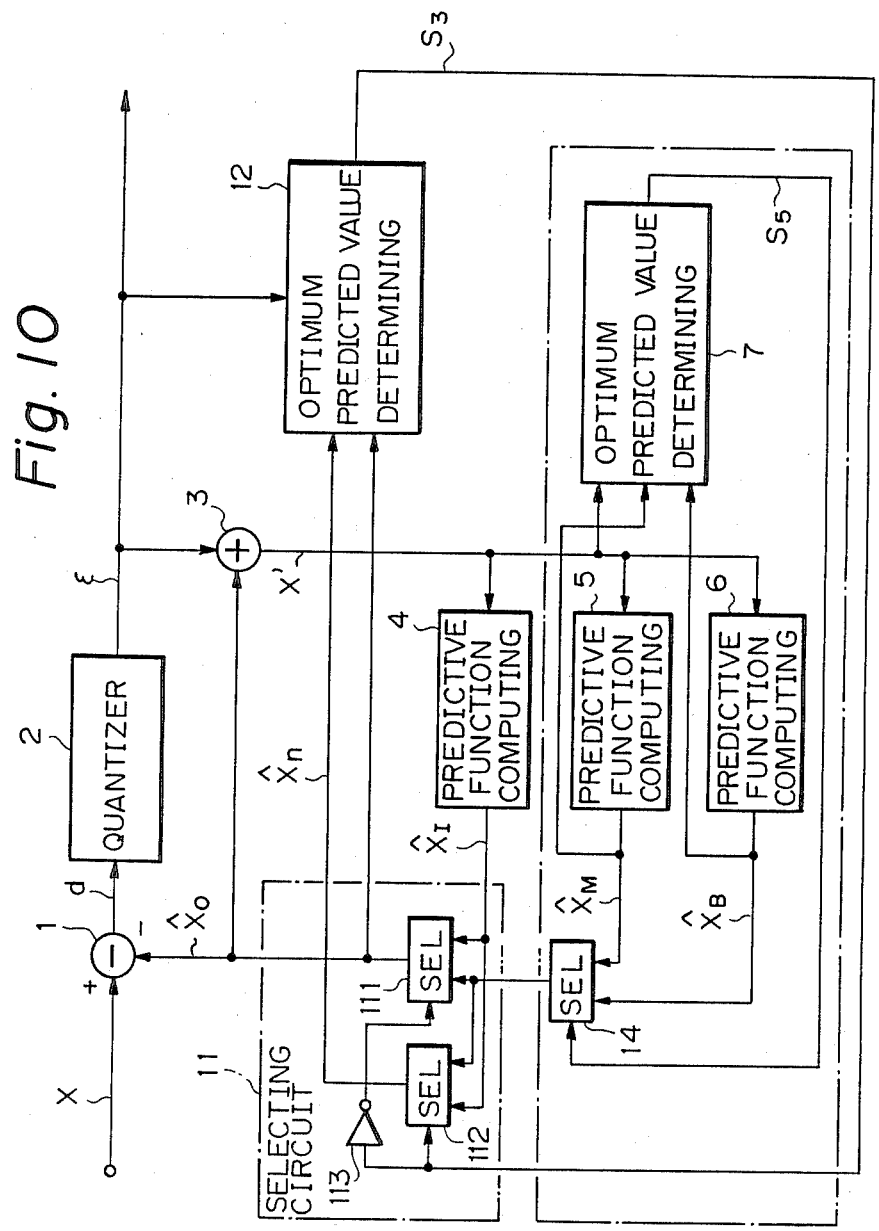

DIFFERENTIAL CODING APPARATUS HAVING AN OPTIMUM PREDICTED VALUE DETERMINING CIRCUIT

BACKGROUND OF THE INVENTION

1. Field of the Invention

The present invention relates to a differential coding apparatus adaptable for the differential coding of a fast video signal such as a TV signal.

2. Related Art of the Invention

Recently, with the development of picture display techniques, it has become necessary to provide a differential coding apparatus for carrying out the differential coding of a fast video signal such as a TV signal to be transmitted. A differential coding apparatus employing an intraframe.interframe differential coding is known and used as the differential coding apparatus for the TV signal. This differential coding apparatus has an intraframe prediction circuit and an interframe prediction circuit, and adaptively selects one of these circuits in response to the movement of a picture to be coded, so that a signal output by the selected circuit can be used as an optimum predicted value.

The intraframe prediction circuit uses, for example, a previous value prediction in which a predicted value of a pixel to be coded is produced on the basis of a reference pixel just prior to the pixel to be coded on the same horizontal scanning line. In this case, a time needed for producing the predicted value of the pixel to be coded on the basis of data of the reference pixel after such data was obtained becomes very short, and accordingly, the determination of the optimum predicted value must be carried out at a high speed. Therefore, in general, the logical elements used in the apparatus must be able to operate at a high speed.

However, such logical elements for high speed operation are expensive and consume much electric power, and accordingly, must have a large size as a heat countermeasure. Further, the high speed processing type logical elements have less durability against noise than low speed processing type logical elements.

Accordingly, one object of the present invention is to provide a differential coding apparatus in which the determination of the optimum predicted value can be carried out at a high speed without using a high speed processing type logical element.

SUMMARY OF THE INVENTION

In accordance with a fundamental aspect of the present invention, there is provided a differential coding apparatus comprising: a predicted value producing means for producing a plurality of predicted values with respect to input data; and a determining means for determining an optimum predicted value from the plurality of predicted values; wherein the process at the predicted value producing means and the process at the determining means are carried out in parallel, and one of the predicted values is selected as the optimum predicted value in accordance with the determined result.

BRIEF DESCRIPTION OF THE DRAWINGS

Embodiments according to the present invention will now be described with reference to the accompanying drawings, in which;

FIG. 2 is a drawing for explaining the intraframe previous value prediction;

FIG. 3 is a time chart for explaining the operation of the apparatus shown in FIG. 1;

FIGS. 5 to 9 are drawings for explaining the operation of the apparatus shown in FIG. 4; and, FIG. 10 is a block diagram showing another embodiment according to the present invention.

DESCRIPTION OF THE PREFERRED EMBODIMENTS

For a better understanding of the preferred embodiments of the present invention, the problems in the prior art will first be explained in detail with reference to FIGS. 1 to 3.

Figure 1:
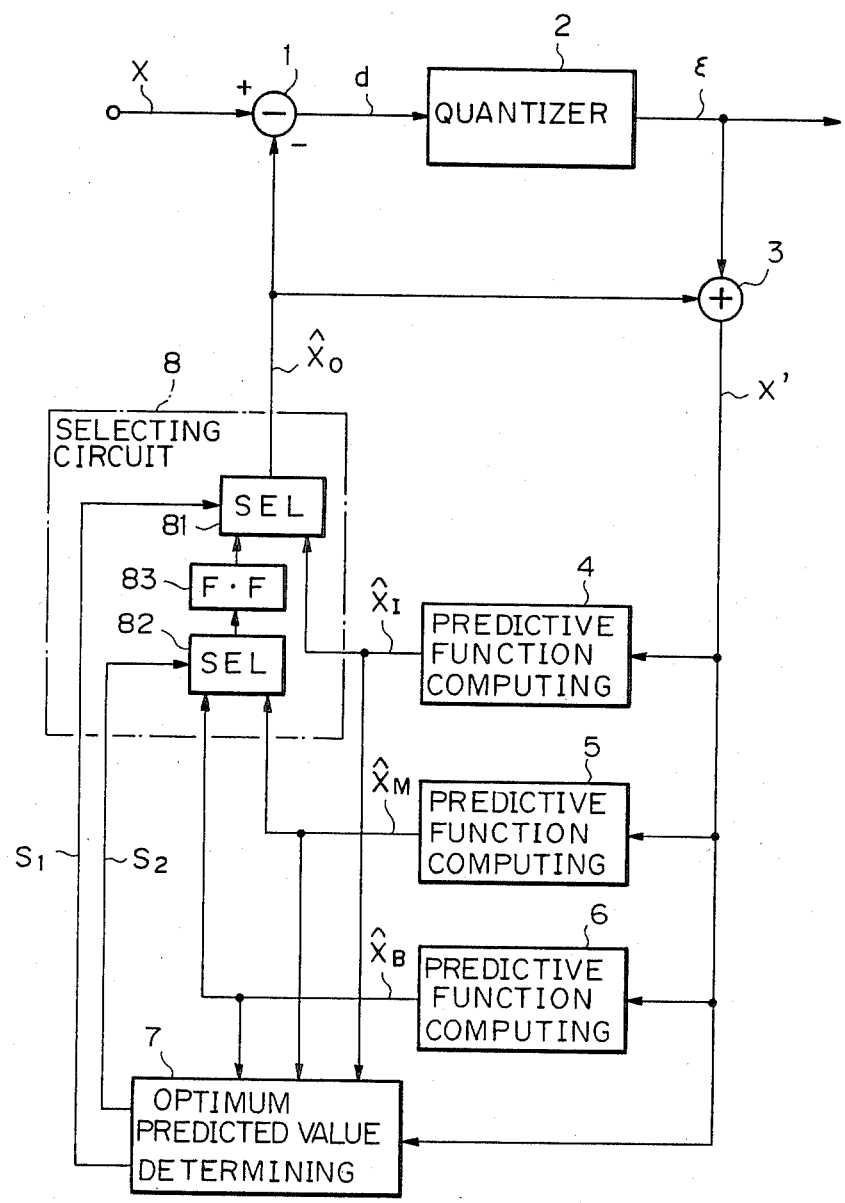
FIG. 1 is a block diagram showing a differential coding apparatus of the prior art.

FIG. 1 is a block diagram showing a differential coding apparatus of the prior art in which an intraframe.interframe adaptive differential coding is carried out. In FIG. 1, the differential coding apparatus comprises a subtracter 1 for subtracting an optimum predicted value $\hat{X}_0$ from an input signal X to obtain a prediction error d; a quantizer 2 for quantizing the predicted error d output from the subtracter 1 to produce a quantized predicted error $\epsilon$ (referred to as a quantized value $\epsilon$ hereinafter); an adder for adding the quantized value $\epsilon$ and the optimum predicted value $\hat{X}_0$ to produce a local decoded signal X'; predictive function computing circuits 4, 5, and 6 which produce predicted values $\hat{X}_I$, $\hat{X}_M$, and $\hat{X}_B$ obtained by different prediction manner, on the basis of the local decoded signal X' output from the adder 3, respectively; an optimum predicted value determining circuit 7 for determining the optimum predicted value $\hat{X}_0$ from predicted values $\hat{X}_I$, $\hat{X}_M$, and $\hat{X}_B$ on the basis of the local decoded signal X' and predicted values $\hat{X}_I$, $\hat{X}_M$, and $\hat{X}_B$ to output selecting signals $S_1$ and $S_2$; and a selecting circuit 8 for selecting the optimum predicted value from predicted values $\hat{X}_I$, $\hat{X}_M$, and $\hat{X}_B$ in response to selecting signals $S_1$ and $S_2$ to be output to the subtracter 1 and the adder 3. The selecting circuit 8 comprises two selectors 81 and 82, and a flip-flop 83.

The intraframe.interframe adaptive differential coding employed in this differential coding apparatus is adapted as an international standard of the CCITT, in which the differential coding apparatus has an intraframe prediction circuit and an interframe prediction circuit and adaptively selects one of those circuits in response to the movement of a picture and uses the output signal thereof as an optimum predicted value.

The predictive function computing circuit 4 carries out the intraframe previous value prediction in which, as shown in FIG. 2, a pixel X(i) to be coded is predicted on the basis of a reference pixel X(i−1) just prior to the pixel X(i) on the same horizontal scanning line. This prediction is normally a linear prediction in which the predicted value X(i) is obtained by multiplying the reference pixel X(i−1) by a prediction coefficient, and the predictive function computing circuit 4 outputs the predicted value $\hat{X}_I$ of the intraframe previous value.

The predictive function computing circuit 5 carries out the interframe prediction for the movement compensation to output the predicted value $\hat{X}_M$ of the movement compensation. The predictive function computing circuit 6 carries out the interframe background prediction to output the background predicted value $\hat{X}_B$.

The operation of the apparatus shown in FIG. 1 is as follows. The optimum predicted value $\hat{X}_0$ is subtracted from the input signal X at the subtracter 1 to produce the prediction error d. The prediction error d is then quantized by the quantizer 2 to produce the quantized value $\epsilon$. The quantized value $\epsilon$ is sent to the transmitting unit (not shown), and at the same time, to the adder 3 to be added to the optimum predicted value $\hat{X}_0$ to produce the local decoded signal X'. Note, it is possible to input the quantized value $\epsilon$ to the adder 3 via an inverting circuit having an inverted characteristic of the quantizer 2.

The local decoded signal X' is input to predictive function computing circuits 4, 5, and 6 to produce predicted values $\hat{X}_I$, $\hat{X}_M$, and $\hat{X}_B$, respectively, which are then input to the selecting circuit 8 and the optimum predicted value determining circuit 7. The determining circuit 7 subtracts each predicted value $\hat{X}_I$, $\hat{X}_M$, and $\hat{X}_B$ from the local decoded signal X', respectively, then compares the subtracted results to determine the optimum predicted value having a minimum subtraction result from those predicted values $\hat{X}_I$, $\hat{X}_M$, and $\hat{X}_B$. The determining circuit 7 then outputs selecting signals $S_1$ and $S_2$ to switch selectors 81 and 82 so that the optimum predicted value $\hat{X}_0$ is output from the selecting circuit 8 to the subtracter 1 and the adder 3.

FIG. 3 is a time chart for explaining the operation of the above-described apparatus. In FIG. 3, (a) denotes a change timing of the predicted value $\hat{X}_I$; (b), a change timing of the predicted value $\hat{X}_M$; (c), a change timing of the predicted value $\hat{X}_B$; (d), a change timing of the local decoded signal X'; and (e), a change timing of the selecting signals $S_1$ and $S_2$.

Assuming that predicted values $\hat{X}_I(i)$, $\hat{X}_M(i)$, and $\hat{X}_B(i)$ are output from computing circuits 4, 5, and 6 currently, and the selecting circuit 8 selects one of those values as the optimum predicted value $\hat{X}_0(i)$. When the determining circuit 7 determines a next optimum predicted value $\hat{X}_0(i+1)$ with respect to predicted values $\hat{X}_I(i)$, $\hat{X}_M(i)$, and $\hat{X}_B(i)$ at the next timing, the local decoded signal X'(i) must be confirmed with respect to the current optimum predicted value $X_0(i)$, and the optimum predicted value $\hat{X}_0(i+1)$ determined by subtracting each of the predicted values $\hat{X}_I(i)$, $\hat{X}_M(i)$, and $\hat{X}_B(i)$ from the local decoded signal X'(i), and the subtracted results then compared with one another.

In this case, as shown in FIG. 3, a delay time $T_1$ from a time point of the change of the predicted values $\hat{X}_I(i)$, $\hat{X}_M(i)$, and $\hat{X}_B(i)$ until the confirmation of the local decoded signal X'(i−1), is a sum of signal delay times occurring at the selecting circuit 8, the subtracter 1, the quantizer 2, and the adder 3. Further, a delay time $T_2$ after the confirmation of the local decoded signal X'(i) until the determining circuit 7 has determined the optimum predicted value, to output the selecting signal S(i+1), is a sum of the time for subtracting each of the predicted values $\hat{X}_I(i)$, $\hat{X}_M(i)$, and $\hat{X}_B(i)$ from the local decoded signal X'(i) and the time for comparing the subtracted results. As described above, to select the following optimum predicted value $X_0(i+1)$ from the predicted values $\hat{X}_I(i)$, $\hat{X}_M(i)$ and $\hat{X}_B$, a sum of the time $T_1$ is needed for confirming the local decoded signal X'(i) with respect to above-mentioned predicted values, and of the time $T_2$ for determining the optimum predicted value $\hat{X}_0(i+1)$ on the basis of the confirmed local decoded signal X'(i).

When, for example, the intraframe prediction by the previous value for the fast TV signal is carried out, the predicting operation must be carried out at a high speed, since this intraframe prediction predicts the predicted value of the pixel X(i) to be coded by using the reference pixel X(i−1) just prior to the pixel X(i) on the same horizontal scanning line. Therefore, in the prior art, the arithmetic circuit of the differential coding apparatus uses high speed processing type logical elements. However, these high speed processing type logical elements are expensive and consume much electric power, and accordingly must have a large size as a heat countermeasure. Further the high speed processing type logical element has less durability against noise than the low speed processing type logical element.

Preferred embodiments of the present invention are now described in detail with reference to FIGS. 4 to 10.

Figure 4:
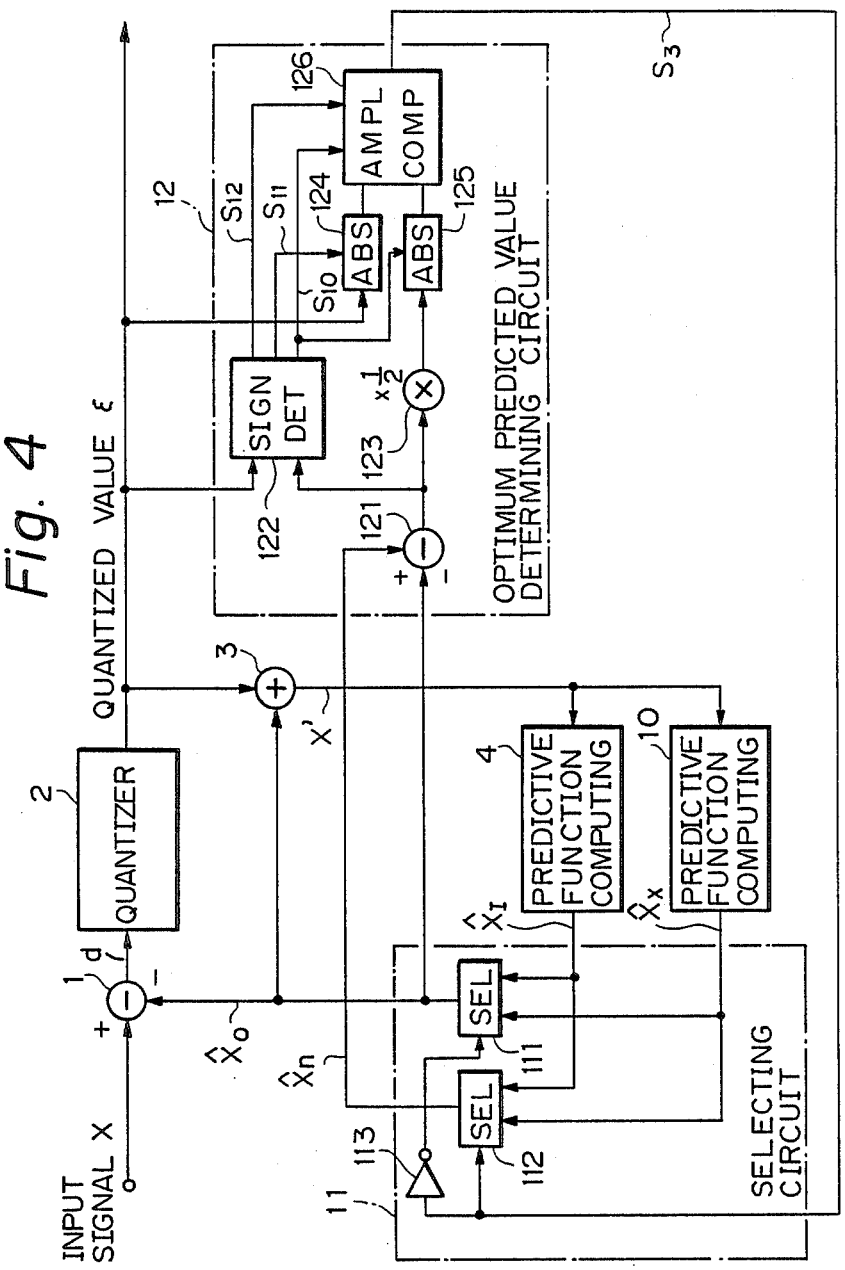
FIG. 4 is a block diagram showing an embodiment of the differential coding apparatus according to the present invention.

FIG. 4 is a block diagram showing an embodiment of the differential coding apparatus according to the present invention. In FIG. 4, 1 denotes a subtracter for subtracting an optimum predicted value $\hat{X}_0$ from an input signal X to produce a prediction error d; 2, a quantizer for quantizing the prediction error d to produce a quantized value $\epsilon$; 3, an adder for adding the quantized value $\epsilon$ and the optimum predicted value $\hat{X}_0$ to produce a local decoded signal X'; 4, a predictive function computing circuit for carrying out the intraframe prediction by the previous value on the basis of the local decoded signal X' to produce a predicted value $\hat{X}_I$; 10, a predictive function computing circuit for carrying out the interframe prediction on the basis of the local decoded signal X' to produce a predicted value $\hat{X}_X$; 11, a selecting circuit which selects one of the predicted values $\hat{X}_I$ and $\hat{X}_X$ as the optimum predicted value $\hat{X}_0$ to be output, and at the same time outputs the non-optimum predicted value $\hat{X}_n$ which is not selected as the optimum predicted value $\hat{X}_0$; 12, an optimum predicted value determining circuit, to which the optimum predicted value $\hat{X}_0$, the non-optimum predicted value $\hat{X}_n$, and the quantized value $\epsilon$ are input, for determining which of the predicted values output from computing circuits 4 and 10 is the optimum predicted value on the basis of those values $\hat{X}_0$, $\hat{X}_n$, and $\epsilon$ to output a selecting signal $S_3$ to the selecting circuit 11 so that the selecting circuit 11 selects the optimum predicted value $\hat{X}_0$ from predicted values $\hat{X}_I$ and $\hat{X}_X$.

The selecting circuit 11 comprises two selectors 111 and 112 and on inverter 113. The selector 111 selects one of predicted values $\hat{X}_I$ and $\hat{X}_X$ as the optimum predicted value $\hat{X}_0$ to be output to the subtractor 1, the adder 3, and determining circuit 12 in response to the selecting signal $S_3$. On the other hand, the selector 112 selects the residuary other predicted value as the non-optimum predicted value $\hat{X}_n$ to be output to the determining circuit 12.

The optimum predicted value determining circuit 12 comprises a subtracter 121, a sign detecting circuit 122, a level regulating circuit 123, absolute value measuring circuits 124 and 125, and an amplitude comparing circuit 126. The subtracter 121 subtracts the optimum predicted value $X_0$ from the non-optimum predicted value $\hat{X}_n$ to output a difference value $(\hat{X}_n - \hat{X}_0)$ to the sign detecting circuit 122 and the level regulating circuit 123. The sign detecting circuit 122, to which the quantized value $\epsilon$ and the difference value $(\hat{X}_n - \hat{X}_0)$ are input, determines the sign of the values $\epsilon$ and $(\hat{X}_n - \hat{X}_0)$ to output a signal $S_{10}$ indicating the sign of the difference value $(\hat{X}_n - \hat{X}_0)$ to the absolute value measuring circuit 125 and the amplitude comparing circuit 126, a signal $S_{11}$ for indicating the sign of the quantized error ε to the amplitude comparing circuit 126, and a signal $S_{12}$ for indicating whether or not the difference value $(\hat{X}_n - \hat{X}_0)$ and the quantized value ε have the same sign to the amplitude comparing circuit 126.

The level regulating circuit 123 multiplies the difference value $(\hat{X}_n - \hat{X}_0)$ by a coefficient of $\frac{1}{2}$, using a bit-shift. The absolute value measuring circuit 124, to which the quantized value ε is input, measures an absolute value $|ε|$ of the quantized value ε to be output to the amplitude comparing circuit 126. The absolute value measuring circuit 125 measures an absolute value $|\hat{X}_n - \hat{X}_0|$ of the difference value $(\hat{X}_n - \hat{X}_0)$ to be output to the amplitude comparing circuit 126. The amplitude comparing circuit 126 carries out a comparison of the amplitudes of the quantized value ε and the difference value $(\hat{X}_n - \hat{X}_0)$ on the basis of absolute values $|ε|$ and $|\hat{X}_n - \hat{X}_0|$ and signals $S_{10}$ and $S_{12}$, to determine which of the computing circuits 4 and 10 will output the optimum predicted value at the next timing, then outputs the selecting signal $S_3$ to the selecting circuit 11.

The operation of the embodiment shown in FIG. 4 will be described hereinafter. The optimum predicted value $\hat{X}_0$ is subtracted from the input signal X at the subtracter 1 to produce the prediction error d, which is then quantized at the quantizer 2 to produce the quantized value ε. The quantized value ε is added to the optimum predicted value $\hat{X}_0$ at the adder 3 to produce the local decoded signal X'. The computing circuits 4 and 10 produce predicted values $\hat{X}_I$ and $\hat{X}_X$ on the basis of the local decoded signal X' respectively.

The determining circuit 12 determines which computing circuits 4 and 10 will output the optimum predicted value with respect to the input signal which is input at the next timing, on the basis of the quantized value ε and the difference value $(\hat{X}_n - \hat{X}_0)$, and outputs the selecting signal $S_3$ according to the determined result to control the selection of the selecting circuit 11. In this way, the optimum predicted value $\hat{X}_0(i+1)$ with respect to the input signal $X(i+1)$ of the next timing is determined on the basis of predicted values $\hat{X}_I(i)$ and $\hat{X}_X(i)$ obtained from the previous input signal $X(i)$. However, the prediction is not degraded, as a correlation between the previous input signal $X(i)$ and the following input signal $X(i+1)$ is close.

An algorithm for determining the optimum predicted value at the determining circuit 12 will be explained hereinafter. The quantized value ε output from the quantizer 2 may be deemed as a difference value $(X' - \hat{X}_0)$ between the local decoded signal X' and the optimum predicted value $X_0$. The operation of $(X' - \hat{X}_0) - (\hat{X}_n - \hat{X}_0)$ by using the difference value $(\hat{X}_n - \hat{X}_0)$ obtained by the subtracter 121 on the basis of values $\hat{X}_n$ and $\hat{X}_0$ output from the selecting circuit 11 yields a value $(X' - \hat{X}_n)$. The optimum predicted value $X_0$ is one of predicted values $\hat{X}_I$ and $\hat{X}_X$ which gives smaller difference values between the input signal X and each of the predicted values $\hat{X}_I$ and $\hat{X}_X$, i.e., $(X' - \hat{X}_I)$ and $(X' - \hat{X}_X)$. Accordingly, by comparing the amplitudes of the quantized value $(X' - \hat{X}_0)$ and the computed value $(X' - \hat{X}_n)$, it is possible to determine whether or not the predictive function computing circuit whose output is selected as the optimum predicted value $\hat{X}_0$ (referred to as an optimum computing circuit hereinafter) at the current timing, will continue to be the optimum computing circuit with respect to the input signal input at the next timing. If the optimum computing circuit is selected continuously at the next timing, the selecting circuit 11 does not carry out the switching. On the other hand, if the predictive function computing circuit whose output is selected as the non-optimum predicted value (referred to as a non-optimum computing circuit hereinafter) at the current timing, is selected at the next timing, the selecting circuit 11 selects the output of the current non-optimum computing circuit as the optimum predicted value at the next timing.

Figure 6:
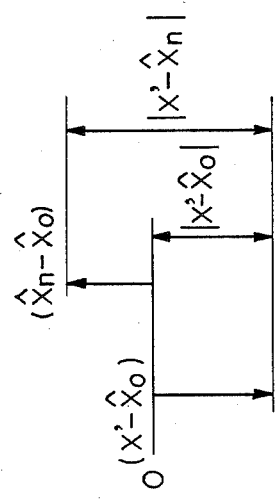
Figure 5:
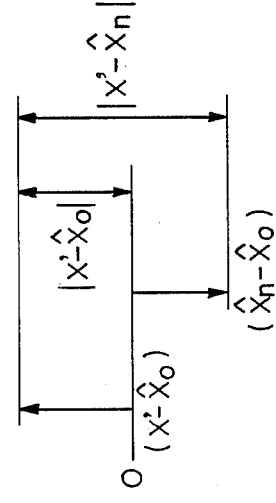

The amplitude comparisons between $(X' - \hat{X}_0)$ and $(X' - \hat{X}_n)$ are carried out as follows. First, the case where the quantized value $ε = (X' - \hat{X}_0)$ and the difference value $(X_n - X_0^{\hat{}})$ have different sings will be described. When the value $(X' - \hat{X}_0)$ is positive and the value $(\hat{X}_n - \hat{X}_0)$ is negative, as shown in FIG. 5, the absolute value of the value $(X' - \hat{X}_0)$ is smaller than that of the value $(X' - \hat{X}_n)$, therefore the predicted value output from the current optimum computing circuit is selected continuously as the optimum predicted value at the next timing. In the same way, when the value $(X' - \hat{X}_0)$ is negative and the value $(\hat{X}_n - \hat{X}_0)$ is positive, as shown in FIG. 6, the predicted value output from the current optimum computing circuit is selected as the optimum predicted value at the next timing. As a result, when the signal $S_{12}$ input to the amplitude comparing circuit 126 indicates the same sign, the amplitude comparing circuit 126 does not change the selecting signal $S_3$ thereof.

Figure 7:
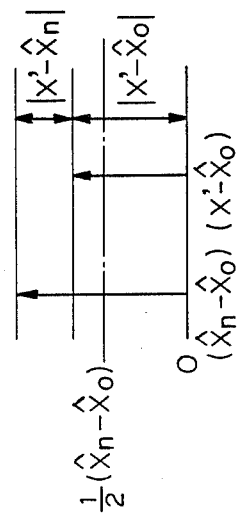

Second, the case where the quantized value ε and the difference value $(\hat{X}_n - \hat{X}_0)$ have the same sign will be described. FIG. 7 shows the case when the value $(\hat{X}_n - \hat{X}_0)$ is positive. The relationships are as follows.

When $\frac{1}{2}(\hat{X}_n - \hat{X}_0) = (X' - \hat{X}_0)$, $|X' - \hat{X}_n| = |X' - \hat{X}_0|$ is obtained. In this case, either $X_n$ or $X_0$ may be selected as the optimum value. In this example, the predicted value of the current non-optimum computing circuit is selected as the optimum predicted value at the next timing, so that the selecting circuit is switched.

When $\frac{1}{2}(\hat{X}_n - \hat{X}_0) > (X' - \hat{X}_0)$, $|X' - \hat{X}_n| > |X' - \hat{X}_0|$ is obtained. Accordingly, the predicted value output from the current optimum computing circuit is selected as the optimum predicted value at the next timing.

When $\frac{1}{2}(\hat{X}_n - \hat{X}_0) < (X' - \hat{X}_0)$, $|X' - \hat{X}_n| < |X' - \hat{X}_0|$ is obtained. Accordingly, the predicted value output from the current non-optimum computing circuit is selected as the optimum predicted value at the next timing.

Figure 8:
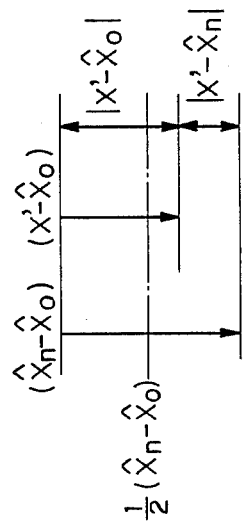

FIG. 8 shows the case when the value $(\hat{X}_n - \hat{X}_0)$ is negative. The relationships are as follows.

When $\frac{1}{2}(\hat{X}_n - \hat{X}_0) = (X' - \hat{X}_0)$, $|X' - \hat{X}_n| = |X' - \hat{X}_0|$ is obtained. Accordingly, as aforementioned, the predicted value output from the current non-optimum computing circuit is selected as the optimum predicted value at the next timing.

When $\frac{1}{2}(\hat{X}_n - \hat{X}_0) > (X' - \hat{X}_0)$, $|X' - \hat{X}_n| < |X' - \hat{X}_0|$ is obtained. Accordingly, the predicted value output from the current non-optimum computing circuit is selected as the optimum predicted value at the next timing.

When $\frac{1}{2}(\hat{X}_n - \hat{X}_0) < (X' - \hat{X}_0)$, $|X' - \hat{X}_n| > |X' - \hat{X}_0|$ is obtained. Accordingly, the predicted value output from the current optimum computing circuit is selected as the optimum predicted value at the next timing.

The amplitude comparing circuit 126 carries out the aforementioned determination on the basis of the input signals $S_{10}$ and $S_{12}$ and input absolute values, then outputs the selecting signal $S_3$ in accordance with the determination.

As described above, the optimum predicted value determining circuit 12 can determine which predictive function computing circuit will output the optimum predicted value at the next timing, on the basis of the quantized value $\epsilon$, the optimum predicted value $\hat{X}_0$, and the non-optimum predicted value $\hat{X}_n$, without using the local decoded signal $X'$. As a result, the processing speed of the differential coding apparatus is increased, which will be explained in detail with reference to FIG. 9.

FIG. 9 is a time chart for explaining the operation of the above-described embodiment. In FIG. 9, (a) denotes a change timing of the predicted value $X_I$; (b), a change timing of the predicted value $X_X$; (c), a change timing of the quantized value $\epsilon$; and (d), a change timing of the selecting signal $S_3$. In the apparatus shown in FIG. 4, a time readed for the prediction operation, which is from when the computing circuits output predicted values $X_I(i)$ and $X_X(i)$ to when the determining circuit 12 determines the next optimum predicted value and outputs the selecting signal $S(i+1)$, is a sum of a time $T_3$ from the confirmation of predicted values $X_I(i)$ and $X_X(i)$ until the confirmation of the quantized value $\epsilon$ and a time $T_4$ needed for determining the optimum predicted value on the basis of the confirmed quantized value.

The time $T_3$ is a sum of each signal delay time occurring at the selecting circuit 11, the subtracter 1, and the quantizer 2. Comparing this time $T_3$ with the prior art, the apparatus of the present invention operates faster than the prior art apparatus shown in FIG. 1 by a signal delay time caused at the adder 4, since the prior art apparatus must confirm the local decoded signal $X'$ for the determination at the determining circuit 7, but the apparatus of the present invention only needs to confirm the quantized value $\epsilon$.

Further, in the prior art apparatus, the optimum predicted value determining circuit 7 carries out the subtraction between the local decoded signal $X'$ and each of predicted values $X_I$, $X_M$, and $X_B$, and then the amplitude comparison of the results obtained by above-amplitude mentioned subtraction, after the confirmation of the local decoded signal $X'$. Conversely, in the differential coding apparatus of the present invention, the difference value $(\hat{X}_n - \hat{X}_0)$ used for determining the optimum predicted value has already been calculated before the confirmation of the quantized value $\epsilon$, therefore it is sufficient for the determining circuit 12 to carry out the amplitude comparison after the confirmation of the quantized value $\epsilon$.

As described above, in the above-mentioned embodiment, the process for obtaining the quantized value $\epsilon$ with respect to the confirmed predicted values $\hat{X}_I$ and $\hat{X}_x$, and the process for obtaining the difference value $(\hat{X}_n - \hat{X}_o)$ between the confirmed predicted values $\hat{X}_I$ and $\hat{X}_x$, are carried out in parallel, and the determination of the optimum predicted value is then carried out by comparing the obtained quantized value and the obtained difference value.

Accordingly, the differential coding circuit of the present invention operates faster than the prior art apparatus by the signal delay time caused at the adder 4 and the time used for the subtraction at the determining circuit 7.

Although a preferred embodiment has been described heretofore, various modifications and alternations are possible within the scope of the present invention.

For example, in the aforementioned embodiment, one predictive function computing circuit carries out the intraframe prediction and the other circuit carries out the interframe prediction. However, this is not a limitation, in that the case in which both computing circuits carry out the intraframe prediction is possible.

FIG. 10 shows another embodiment in which, as in the apparatus of FIG. 1, the intraframe prediction, the interframe movement compensation prediction, and the interframe background prediction are carried out. In FIG. 10, the same reference numbers as in FIG. 1 denote the same components. In this embodiment, the local decoded signal $X'$ output from the adder 3 is input to the predictive function computing circuits 4, 5, and 6, and the optimum predicted value determining circuit 7. Predicted values $\hat{X}_M$ and $\hat{X}_B$ output from computing circuits 5 and 6 are input to a selector 14 and the optimum predicted value determining circuit 7. The determining circuit 7 selects one of the predicted values $\hat{X}_M$ and $\hat{X}_B$ as the optimum predicted value in the same way as described in the prior art, and outputs a selecting signal $S_5$.

The selector 14 sends the selected predicted value to the selecting circuit 11. The other operations of this embodiment are the same as that of FIG. 4. Thus the selecting circuit 11 selects one of two input predicted values as the optimum predicted value in response to the selecting signal output from the determining circuit 12.

Here, the optimum predicted value determining circuit 7 determines the optimum predicted value on the basis of the local decoded signal $X'$. However, the determination of the optimum predicted value for the input signal on the current frame is carried out on the basis of data of the previous frame, since computing circuits 5 and 5 carry out the interframe prediction. Accordingly, the processing time for determination is long enough, and allows the apparatus to be constituted by using logical elements for low speed processing in spite of the high speed input signal.

We claim:

1. A differential coding apparatus comprising:
   predicted value producing means for producing a plurality of predicted values with respect to input data; and
   determining means for determining an optimum predicted value from said plurality of predicted values;
   wherein a process at the predicted value producing means and a process at the determining means are carried out in parallel, and one of said predicted values is selected as the optimum predicted value in accordance with the determined result.

2. A differential coding circuit according to claim 1, wherein the predicted value producing means comprises an intraframe predictive function computing circuit and an interframe predictive function computing circuit.

3. A differential coding apparatus according to claim 1, wherein the predicted value producing means comprises two intraframe predictive function computing circuits.

4. A differential coding apparatus according to claim 1, wherein the determining means carries out the determination on the basis of a signal obtained by quantizing a difference data obtained by subtracting the optimum predicted value from the input data, and the plurality of predicted values obtained from the predicted value producing means.

5. A differential coding apparatus comprising:

a subtracter for producing a difference of an input signal and an optimum predicted value;

a quantizer for quantizing the difference output from the subtracter to produce a quantized value;

an adder for adding the quantized value and the optimum predicted value to produce a local decoded signal;

a plurality of predictive function computing circuits each producing the predicted value with respect to the input signal input at a next timing on the basis of the local decoded signal; and an optimum predicted value determining circuit for determining the optimum predicted value from the plurality of predicted values output from said plurality of predictive function computing circuits;

wherein the quantized value is input to the optimum predicted value determining circuit which carries out the determination of the optimum predicted value in parallel with the predicted value producing a timing and the optimum predicted value is selected on the basis of the determined result.

6. A differential coding apparatus according to claim 5 further comprising:

a selector for selecting the optimum predicted value in accordance with the determination of the optimum predicted value determining circuit, to be output to the subtractor.

7. A differential coding apparatus according to claim 5, wherein the optimum predicted value determining circuit comprises:

a second subtracter for subtracting predicted values from said plurality of predictive function computing circuits;

a sign detecting circuit for detecting signs of the second difference obtained by the second subtractor and the quantized value output from the quantizer;

an absolute value circuit for measuring absolute values of the second difference and the quantized value; and an amplitude comparing circuit for comparing the amplitude of the quantized value and the amplitude of the second difference output from the absolute value circuit;

wherein the optimum predicted value is selected from the plurality of predicted values according to the output of the amplitude comparing circuit.

8. A differential coding apparatus comprising:

difference means for obtaining a first difference value between an input signal and an optimum predicted value to produce a prediction error;

producing means for producing a local decoded signal on the basis of the first difference value and the optimum predicted value;

predicting means for producing a plurality of predicted values obtained in different ways respectively on the basis of the local decoded signal;

determining means for determining the optimum predicted value from the plurality of predicted values on the basis of the first difference value and the plurality of predicted values; and selecting means for selecting the optimum predicted value from the plurality of predicted values in response to the determination of the determining means.

9. A differential coding apparatus according to claim 8, wherein the predicting means includes two intraframe predictive function computing circuits.

10. A differential coding apparatus according to claim 8, wherein the number of predicted values is two, and the determining means carries out the determination of the optimum predicted value by comparing the first difference value and a second difference value between the predicted values.

11. A differential coding apparatus according to claim 10, wherein the determining means comprises:

a subtracter for producing the second difference value between the predicted values;

a sign detector for detecting signs of the first difference value and the second difference value;

an absolute value circuit for measuring absolute values of the first difference value and second difference value; and an optimum predicted value determining circuit for determining the optimum predicted value from two predicted values on the basis of the signs detected at the sign detector and absolute values measured at the absolute value circuit.

12. A differential coding apparatus according to claim 8, wherein the predicting means includes an intraframe predictive function computing circuit and an interframe predictive function computing circuit.

13. A differential coding apparatus according to claim 12, wherein the interframe predictive function computing circuit comprises:

a first predictive function computing circuit for carrying out a movement compensation prediction to output a first predicted value;

a second predictive function computing circuit for carrying out the background prediction to output a second predicted value;

a determinating and selection circuit for selecting one of the first and second predicted values as optimum on the basis of the local decoded signal and the first and second predicted values.

* * * * *